US008607247B2

(12) United States Patent
Howes et al.

(10) Patent No.: US 8,607,247 B2
(45) Date of Patent: Dec. 10, 2013

(54) METHOD AND SYSTEM FOR WORKITEM SYNCHRONIZATION

(75) Inventors: Lee W. Howes, Santa Clara, CA (US); Benedict R. Gaster, Santa Cruz, CA (US); Michael C. Houston, Cupertino, CA (US); Michael Mantor, Orlando, FL (US); Mark Leather, Los Gatos, CA (US); Norman Rubin, Cambridge, MA (US); Brian D. Emberling, San Mateo, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 245 days.

(21) Appl. No.: 13/288,833

(22) Filed: Nov. 3, 2011

(65) Prior Publication Data

US 2013/0117750 A1    May 9, 2013

(51) Int. Cl.
G06F 9/46 (2006.01)
G06F 1/04 (2006.01)
G06F 1/12 (2006.01)
G06F 7/00 (2006.01)

(52) U.S. Cl.
USPC ........... 718/106; 718/101; 718/107; 718/108; 713/375; 713/400; 707/610; 707/613; 707/620; 707/624

(58) Field of Classification Search
None
See application file for complete search history.

(56) References Cited

U.S. PATENT DOCUMENTS

| 5,930,807 | A * | 7/1999 | Ebrahim et al. ...................... 1/1 |
| 7,587,555 | B2 * | 9/2009 | Collard et al. ................ 711/138 |
| 2002/0078125 | A1 * | 6/2002 | Ichinose et al. ............... 709/107 |
| 2007/0113233 | A1 * | 5/2007 | Collard et al. ................ 718/101 |
| 2008/0250088 | A1 * | 10/2008 | Printezis et al. .............. 707/206 |
| 2008/0301677 | A1 * | 12/2008 | Park et al. ..................... 718/100 |
| 2009/0006767 | A1 * | 1/2009 | Saha et al. .................... 711/145 |
| 2009/0037707 | A1 | 2/2009 | Blocksome et al. |
| 2009/0240890 | A1 * | 9/2009 | Collard et al. ................ 711/125 |
| 2010/0218195 | A1 * | 8/2010 | Adl-Tabatabai et al. ..... 718/107 |
| 2010/0281082 | A1 * | 11/2010 | Ylonen ......................... 707/816 |
| 2010/0332538 | A1 * | 12/2010 | Gray et al. .................... 707/774 |
| 2010/0332716 | A1 * | 12/2010 | Sheaffer et al. .................. 711/3 |
| 2011/0145304 | A1 * | 6/2011 | Gray et al. .................... 707/820 |
| 2011/0145512 | A1 * | 6/2011 | Adl-Tabatabai et al. ..... 711/141 |
| 2011/0252075 | A1 * | 10/2011 | Ylonen et al. ................ 707/818 |
| 2011/0264712 | A1 * | 10/2011 | Ylonen ......................... 707/818 |
| 2013/0024662 | A1 * | 1/2013 | Renganarayana et al. .... 712/208 |

OTHER PUBLICATIONS

Ma et al. "Barrier Optimization for OpenMP Program". ACIS International Conference on Software Engineering, Artifical Intelligence, Networking and Parallel/Distributed Computing IEEE, 2009.*

(Continued)

*Primary Examiner* — Emerson Puente
*Assistant Examiner* — Adam Lee
(74) *Attorney, Agent, or Firm* — Sterne, Kessler, Goldstein & Fox P.L.L.C.

(57) ABSTRACT

Method, system, and computer program product embodiments for synchronizing workitems on one or more processors are disclosed. The embodiments include executing a barrier skip instruction by a first workitem from the group, and responsive to the executed barrier skip instruction, reconfiguring a barrier to synchronize other workitems from the group in a plurality of points in a sequence without requiring the first workitem to reach the barrier in any of the plurality of points.

20 Claims, 11 Drawing Sheets

(56) References Cited

OTHER PUBLICATIONS

Agarwal, S., et al., "Distributed Generalized Dynamic Barrier Synchronization," *Proceedings of the 12th International Conference on Distributed Computing and Networking*, 143-154, Springer-Verlag, Berlin, Germany (Jan. 2011).

"ATI Stream Computing OpenCL Programming Guide," in *ATI Stream Computing OpenCL Programming Guide*, Advanced Micro Devices, Sunnyvale, CA (Jun. 2010).

Gummaraju, J., et al., "Efficient Implementation of GPGPU Synchronization Primitives on CPUs," *Proceedings of the 7th ACM International Conference on Computing Frontiers*, 85-86, Association for Computing Machinery, New York, NY (May 2010).

Xiao, S., et al., "Inter-block GPU Communication Via Fast Barrier Synchronization," *2010 IEEE International Symposium on Parallel & Distributed Processing (IPDPS)*, IEEE, Piscataway, NJ (Apr. 2010).

International Search Report and Written Opinion for International Application No. PCT/US2012/062768, European Patent Office, Netherlands, mailed on Dec. 18, 2012.

\* cited by examiner

```
Kernel loadKernel(global float *data, local float *sharedData)
{
    // get workitem 0 in the group load the group's constant from data
    // and place it in the shared array
    if( get_locaLid(0) == 0) {
        sharedData[0] = data[get_group_id(0)];
    }
    // Ensure all workitems wait for the operation to complete
    barrier(CLK_GLOBAL_MEM_FENCE);
    ... // do something using the shared value
}
```

FIG. 1A
(PRIOR ART)

```
float loadFunction (global float *data, local float *sharedData)
{
    // get workitem 0 in the group load the group's constant from data
    // and place it in the shared array
    if( get_locaLid(0) == 0) {
        sharedData[0] = data[get_group_id(0)];
    }

// Ensure all workitems wait for the operation to complete
    barrier(CLK_GLOBAL_MEM_FENCE);
    return sharedData[0];
}
```

FIG. 1B
(PRIOR ART)

```
kernel theKernel(global float *data, local float *sharedData)
{
  float val= loadFunction(data, sharedData);
  // do something using val
}
```

FIG. 1C
(PRIOR ART)

```
kernel theKernel(global float *data, local float *sharedData)
{
  If ( someCondition ) {
    float val= loadFunction(data, sharedData);
    // do something using val
  } else {
    // we know we don't need to do that load here
  }
}
```

FIG. 1D
(PRIOR ART)

```
kernel theKernel(global float *data, local float *sharedData)
{
  barrier b;
  while( someCondition ) {
    b. wait();
    // do something
  }
  b.skip();
}
```

FIG. 2A

```
kernel theKernel(global float *data, local float *sharedData)
{
  barrier b;
  if( someCondition ) {
    // pass the barrier object down to the called function
    float val= loadFunction(data, sharedData, b);
    // do something using val
  } else {
    // Instead of arrive, skip here. That way loadFunction can use the barrier
    // more than once while maintaining correct behavior. If arrive were used
    // waiting a second time in loadFunction would
    // cause a wait on this workitem too, which is undesired behavior.
    b.skip();
    // we know we don't need to do that load here
  }
} float loadFunction (global float *data, local float *sharedData, barrier b)
{
  // get workitem 0 in the group load the group's constant from data
  // and place it in the shared array
  if( get_locaLid(0) == 0) {
    sharedData[0] = data[get_group_id(0)];
  }
  // Wait specifically on the barrier we passed:
  b.wait();
  // Communicate in some way
  // Wait a second time
  b.wait();
  return sharedData[0];
}
```

FIG. 2B

```
kernel theKernel(global float *data, local float *sharedData)
{
  barrier b;
  if( someCondition ) {
    // pass the barrier object down to the called function
    float val= loadFunction(data, sharedData, b);
    // do something using val
  } else {
    // Instead of arrive, skip here. That way loadFunction can use the barrier more than once while
    // maintaining correct behavior. If arrive were used waiting a second time in load Function would
    // cause a wait on this workitem too, which is undesired behavior.
    b.skip();
    // we know we don't need to do that load here
  }
  b.reset();
  //Do more
  b.wait();
  // Do more post synchronization of *all* workitems
}
```

FIG. 3

```
kernel theKernel(global float *data, local float *sharedData)
{
  // A barrier for 16 workitems
  barrier b(16);
  If ( someCondition that applies only to 16 workitems in the set) {
    // pass the barrier object down to the called function
    float val= loadFunction(data, sharedData, b);
    // do something using val
  } else {
    // We know that the first condition dealt with only 16 workitems. The rest will follow this path
    // and hence do not need to notify the barrier of their wish to skip.
  }
}
```

FIG. 4A

```
kernel theKernel(global float *data, local float *sharedData)
{
  // create two barriers to seperately synchronize two groups of workitems
  barrier b1, b2;
  If ( someCondition that applies only to b1 workitems) {
      // do something
      b2.skip();
      b1.wait();
      // do something
  } else { // else applies only to b2 workitems
      // do something
      b1.skip();
      b2.wait();
      // do something
  }
}
```

FIG. 4B

```
kernel theKernel(global float *data, local float *sharedData)
{
  // create outer barrier b1
  barrier b1;
  If ( someCondition ) {
       // do something
       b1.wait();
       // do something
       // create inner barrier b2
       barrier b2(b1);
       if ( someCondition2 ) {
            b2.wait();
       }
       b2.skip();
       // do something
  }
  // do something
  b1.skip();
  // do something
}
```

FIG. 4C

METHOD AND SYSTEM FOR WORKITEM SYNCHRONIZATION

BACKGROUND

1. Field of the Invention

The present invention relates generally to workitem synchronization.

2. Background Art

Graphics processing units (GPU) generally comprise multiple processing elements that are ideally suited for executing the same instruction on parallel data streams, as in the case of a single instruction multiple data (SIMD) device, or in data-parallel processing. In many computing models, a central processing unit (CPU) functions as the host or controlling processor and hands-off specialized functions, such as graphics processing, to other processors such as GPUs.

Multi-core CPUs, where each CPU has multiple processing cores, offer processing capabilities for specialized functions (e.g., graphics processing) similar to those available on the GPU. One or more of the computation cores of multi-core CPUs or GPUs can be part of the same die (e.g., AMD Fusion™) or, alternatively, in different dies (e.g., Intel Xeon™ with NVIDIA GPU). Recently, hybrid cores having characteristics of both CPU and GPU (e.g., CellSPE™, Intel Larrabee™) have been proposed for general purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets. Many of the multi-core CPU cores have performance that is comparable to GPUs in many areas.

Several frameworks have been developed for heterogeneous computing platforms that have CPUs and GPUs. These frameworks include BrookGPU by Stanford University, the compute unified device architecture (CUDA) by NVIDIA, and OpenCL by an industry consortium named Khronos Group. The OpenCL framework offers a C-like development environment which users can create applications for the GPU. OpenCL enables the user, for example, to specify instructions for offloading some computations, such as data-parallel computations, to a GPU. OpenCL also provides a compiler and a runtime environment in which code can be compiled and executed within a heterogeneous, or other, computing system.

The computing model embodied by OpenCL, CUDA and many low level GPU intermediate languages, is sometimes known as a single instruction multiple thread ("SIMT"). In a frequently used implementation of the SIMT model, SIMD execution using hardware mask sets on vectors is used to simulate threading to a finer grain than what is available in the hardware.

In order to efficiently utilize computing models where the CPU and the GPU can both be used for the execution of code of many types, more flexible thread synchronization models are needed. The conventional workitem synchronization available in OpenCL, for example, may be less efficient when used with workitems that are not traditional graphics processing tasks. For example, whereas respective concurrent workitems in a graphics processing task may not often diverge, in CPU associated applications, divergence of execution may be relatively higher. The synchronization model provided in OpenCL, by itself, is inadequate to handle such dynamic behavior of workitems.

In OpenCL, workitems within a workgroup can be synchronized. Within a workgroup, a barrier instruction can be issued with the semantics that all workitems in the workgroup must reach the barrier before any can proceed past the barrier. A "barrier" blocks all processes that reach it until the semantics noted above is satisfied. It then releases the blocked processes to resume their respective processing. However, in OpenCL and other similar conventional frameworks, barrier use in control flow is heavily restricted.

FIG. 1A illustrates the use of a single workitem (referred to in FIG. 1A as a kernel) to load a value into a group-shared memory space from which other workitems can obtain the loaded value. The workitem that loads the value, as well as other workitems in the workgroup, are blocked from proceeding beyond the barrier until all workitems in the group reach the barrier.

The above operation of loading the value into group-shared memory can also be done from within a library function which is called from the kernel code. FIG. 1B illustrates a library function including a barrier instruction. FIG. 1C is a kernel that calls the library function. The code in FIG. 1C illustrates an operation to block all workitems that call the corresponding library until the designated workitem has loaded the data to the shared area.

FIG. 1D illustrates an example where placing a call to the barrier inside a library may lead to incorrect operations. For example, calling a library function that includes the barrier instruction from a kernel having a conditional, in which one of the conditionals does not have a call to the function, may lead to deadlock. This is because while the barrier would release only when all workitems of a group have reached it, one or more workitems, for which a condition is not fulfilled, would not reach the barrier at all.

Moreover, in the workitem synchronization framework of OpenCL, workitems in a workgroup executing the kernel must execute the barrier instruction before any are allowed to continue execution. The barrier instruction must be encountered (i.e., reached in the instruction stream) by all workitems in a workgroup executing the kernel. If the barrier instruction is inside a conditional statement, then all workitems must enter the conditional if any workitem enters the conditional statement and executes the barrier. If the barrier instruction is inside a loop, all workitems must execute the barrier instruction for each iteration of the loop before any are allowed to continue execution beyond the barrier. These restrictions can limit the system's and the programmer's ability to optimally utilize processing resources.

What is needed, therefore, are a method and system that enable more flexible and efficient use of workitem synchronization.

SUMMARY OF EMBODIMENTS

Methods and systems for more efficient and flexible scheduling of workitems are disclosed. A technique is disclosed for a workitem to indicate that it is permanently leaving a synchronization group such that subsequent barriers that occur in the execution of workitems in that synchronization group do not wait for the workitem that had announced its departure from the group. A further technique is disclosed by which a workitem can rejoin the synchronization group in order to continue to synchronize with other workitems of that group. The disclosed techniques may yield substantial advantages in improved processing efficiency and flexibility in programming in various situations.

The disclosed method, system, and computer program product embodiments include executing a barrier skip instruction by a first workitem from the group, and responsive to the executed barrier skip instruction, reconfiguring a barrier to synchronize other workitems from the group in a plurality of points in a sequence without requiring the first workitem to reach the barrier in any of the plurality of points.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings:

FIGS. 1A-1D illustrate conventional barrier synchronization examples in pseudocode.

FIG. 2A illustrates a barrier skip instruction (in pseudocode) according to an embodiment of the present invention.

FIG. 2B illustrates a kernel with a barrier skip instruction using a library call (in pseudocode), according to the embodiment.

FIG. 3 illustrates a barrier reset instruction (in pseudocode), according to the embodiment.

FIG. 4A-4C illustrate pseudocode samples of exemplary use cases for barrier synchronization, according to the embodiment.

DETAILED DESCRIPTION OF EMBODIMENTS OF THE INVENTION

Figure 5:
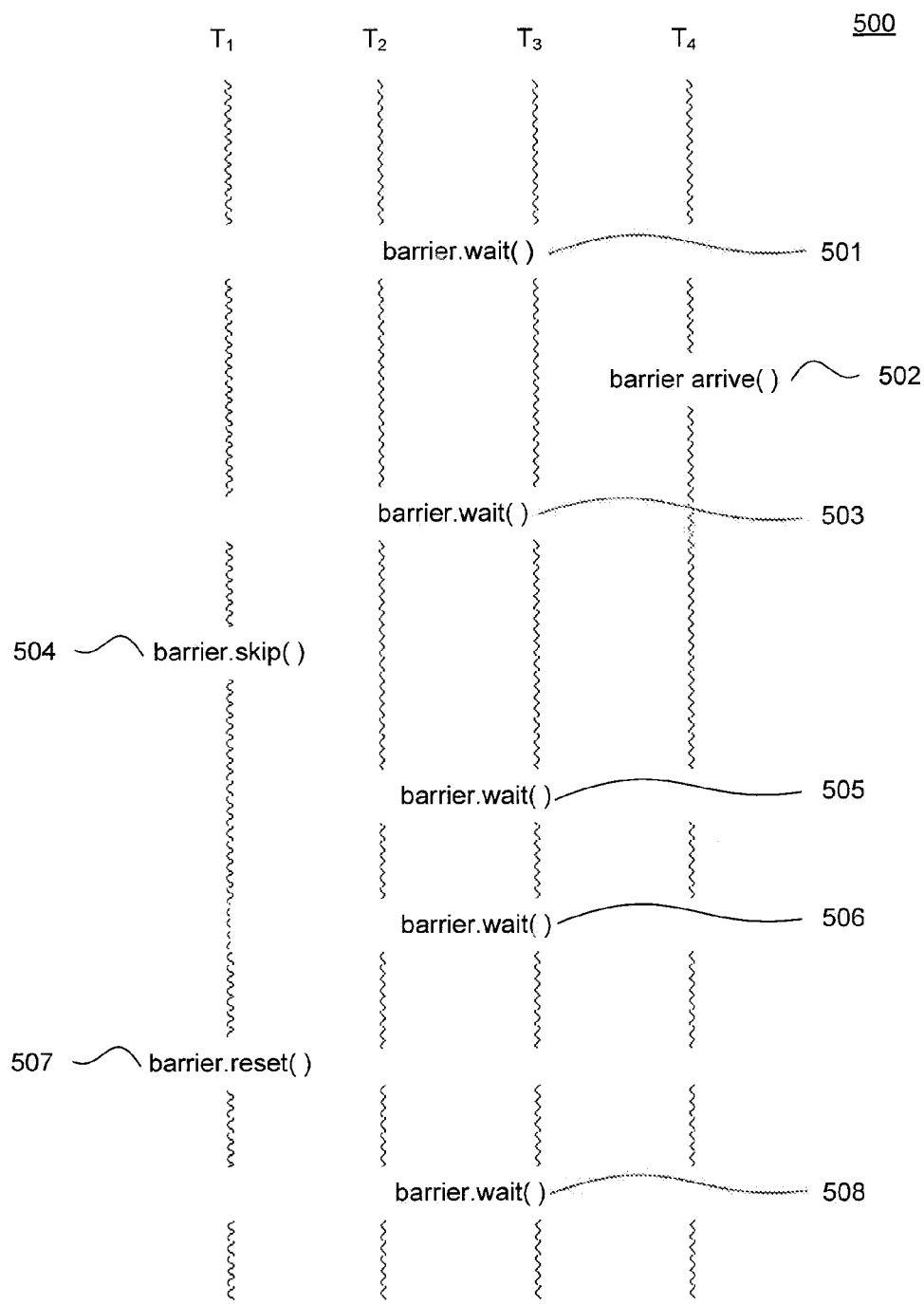
FIG. 5 illustrates an exemplary flow over time of several workitems, according to the embodiment.

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system, computing device, entertainment system, media system, game systems, communication device, personal digital assistant, or any system using one or more processors. The present invention may be particularly useful where the system comprises a heterogeneous computing system. A "heterogeneous computing system," as the term is used herein, is a computing system in which multiple kinds of processors are available.

In a GPU, workitems assigned to a processing element are referred to as a "workgroup". Two or more workitems that are issued for execution in parallel is a "wavefront". A workgroup may comprise one or more wavefronts. Although embodiments are primarily described in relation to synchronizing workitems of a workgroup, the teachings of this disclosure may be applied to synchronize workitems across any one or more processors and/or groups of processes that have access to a shared memory. The term "kernel", as used herein, refers to a program and/or processing logic that is executed as one or more workitems in parallel having the same code base. It should be noted that, in some embodiments, the terms "workitem" and "thread" are interchangeable. The interchangeability, in this disclosure, of "workitem" and "thread" is illustrative, for example, of the flexible simulated or true independence of workitem execution embodied in the model in embodiments.

Embodiment of the present invention can significantly improve the performance of systems by enabling more efficient and more flexible synchronization between concurrent workitems. In a GPU, multi-core CPU, or other processor that executes a very large number of concurrent workitems, for example, using a SIMD or SIMT framework, the embodiments improve efficiency by enabling some workitems to leave and/or re-join a group of workitems that synchronize their execution at several points in the instruction flow. For example, when a particular workitem requires no farther synchronization with the rest of the synchronization group, it may issue a barrier skip instruction to permanently remove itself from the synchronization group.

A barrier reset instruction may be issued subsequently if the particular workitem has to be included again in the synchronization group. The skip instruction, in effect, declares that the corresponding workitem will not any point before the barrier is reset reach the barrier. The reset instruction allows the same barrier to be reused.

By enabling a workitem to permanently skip a barrier, various performance improvements will be achieved. For example, programming flexibility is significantly improved (as illustrated in FIG. 2A-2B), thus allowing the creation of more efficient code. Loop behavior (particularly in systems with a large number of concurrent workitems) is also improved.

For example, in conventional systems (including systems that include arrive and wait operations on a barrier) all workitems are held back by a loop that includes a barrier until the longest iterating workitem completes its iterations. By contrast, in embodiments of the present invention, workitems that do not require further synchronization with the group can exit the loop without causing a deadlock in the system.

Improvements in processing speed are realized as well as improvements in power efficiency.

FIG. 2 illustrates a function (in pseudocode) in which a barrier skip instruction (e.g., b.skip( )) is used in accordance with an embodiment of the present invention. A named barrier b is declared, and a skip instruction is issued after exiting a conditional loop. Within the loop, the workitem waits on b until a specified condition is satisfied.

All workitems corresponding to a "theKernel" function (illustrated in FIG. 2A) may not iterate the same, or a similar number of iterations while in the loop. As each workitem exits the loop, the skip instruction is issued. Tne issuing of the skip instruction by an exiting workitem indicates to other workitems that have not yet left the loop, that the exiting workitem will not reach the barrier again. Thus, the barrier can be reconfigured to avoid waiting for the exiting workitem in the current and subsequent instantiations until, at least, another instruction, referred to as a "barrier reset." is issued. For example, the barrier can be reconfigured such that the number of workitems required to reach the barrier can be reduced to account for the exiting workitem.

In conventional systems, workitems that included a barrier function (e.g., barrier( ) or barrier( ).wait) within a loop could not be handled efficiently. For example, to prevent deadlock, it was necessary to force all workitems in a group to iterate the same number of times such that in each iteration, the barrier is reached (or visited) by all workitems. Such an approach would clearly be wasteful in environments where the workitems could have different execution paths.

Another conventional synchronization instruction is barrier arrive. The arrive instruction, however, only releases the caller from the current barrier. For example, if in FIG. 2A, the skip instruction is replaced with an arrive instruction, the barrier would still require the exiting workitem to reach the barrier in the subsequent barrier instances. Thus, the arrive instruction does not provide a mechanism by which a workitem can permanently remove itself from a synchronization group.

FIG. 2B is an illustration of a library function "loadFunction" in pseudocode that allows a selected workitem to copy data to a shared space with other workitems in accordance with the present invention. The library function includes two calls to a barrier wait instruction (e.g., b.wait( )). The two barrier wait instructions will be issued by any workitem that calls the library function.

In FIG. 2B, the kernel function "theKernel" calls loadFunction when a specified condition is satisfied. Otherwise, it issues a skip instruction.

The skip instruction in the else portion of the conditional (in FIG. 2B) ensures that all workitems that do not satisfy the condition call a skip instruction. Thus, all workitems that fail to satisfy the condition would be exempted from both subsequent instances of the barrier, and the barrier instances would not wait on these workitems. The instances of the barrier in an instruction flow may be referred to as synchronization points. The two synchronization points correspond to the two calls to barrier wait (b.wait( )) in the library function. Deadlock would not occur because each workitem either calls the loadFunction and thereby reaches the barrier at the two synchronization points, or calls the skip instruction exempting itself from having to reach any subsequent instances of the barrier.

In contrast, if a conventional arrive instruction was used in FIG. 2B instead of the skip instruction, a deadlock would occur. For example, although each workitem that does not satisfy the condition executes the arrive instruction, the arrive instruction only exempts the issuing workitem from the immediate next barrier. The issuing workitem would be expected to reach the barrier at the second synchronization point and, therefore, a deadlock would occur.

FIG. 3 is an illustration, in pseudocode, of use of the barrier reset instruction (e.g., b.reset), according to an embodiment. The kernel function "theKernel" calls loadFunction when a specified condition is satisfied, as illustrated in FIG. 2B. Otherwise, it issues a skip instruction followed by a reset instruction.

The issuing of the skip instruction, as described above in relation to FIG. 2B, ensures that all workitems that fail to satisfy the condition would be exempted from both subsequent synchronization points. The barrier at the synchronization points would not wait on these workitems. The barrier reset instruction resets the barrier to its original configuration. For example, whereas the skip instruction, in effect, reduced the size of the synchronizing group for the barrier, the reset instruction reverses the effect of any preceding skip instructions issued by workitems in the group. The implementation of the reset instruction requires that any pending barriers are synchronized before the reset is completed. According to some embodiments, the barrier reset is implemented as a self-synchronizing instruction that causes a synchronization point across all workitems with involvement in the barrier instance the reset is applied to. In other embodiments, a user may include one or more synchronization points to ensure synchronization at the reset instruction. FIG. 4A is an illustration, in pseudocode, of use of a barrier having a defined size independent of its group size, according to an embodiment. For example, barrier b may be created with an original synchronization group size of 16, regardless of how many workitems are in the work group from which the barrier is called. Creating barrier b with a defined size of 16 enables any process calling a wait instruction on barrier b to synchronize with any fifteen of the workitems in the group that synchronizes on barrier b.

A barrier with a defined size may be created for an application in which it is known that only a particular number of the workitems would satisfy a defined condition. In this manner, as shown in FIG. 4A, the workitems that satisfy the condition can synchronize on barrier b, while the others take the "else" path. Because the barrier is only waiting for the defined number of workitems which meet the condition, no deadlock condition would occur, and workitems that do not satisfy the condition are not required to issue a skip instruction.

In the exemplary illustration of FIG. 4B, barriers are used to synchronize two groups of workitems. One group satisfies a specified condition. The other group not satisfying that condition, may be synchronized separately using barriers b1 and b2. The workitem belongs to the b1 synchronization group or the b2 synchronization group and can issue a skip instruction to the group it does not belong to.

In the exemplary illustration of FIG. 4C, hierarchical barriers in pseudocode are used. Workitems that satisfy a first specified condition synchronize on a wait instruction upon a barrier b1, and other workitems skip barrier b1. Those workitems that satisfy the first specified condition encounter another barrier b2. Of the workitems that encounter the second barrier b2, those that satisfy a second condition. wait on b2—the others skip b2. As shown in the pseudocode, barrier b2 is created based upon the current state of barrier b1.

More specifically, the size of barrier b2 (i.e., number of workitems for which b2 enforces synchronization) is represented by the number of workitems that have not issued a skip instruction upon b1. In FIG. 4C this number is the number of workitems that satisfied the first condition. Other embodiments may require the underlying implementation of the barrier update b2 when b1 is skipped. Moreover, in order to avoid race conditions that may occur in some situations in the update of b2, the b1 skip operation may be protected by having a synchronization point before the b1 skip operation.

FIG. 5 is an illustration of an exemplary flow 500 over time of several workitems T1, T2, T3, and T4, according to an embodiment of the present invention. As shown, T1, T2, T3, and T4 start concurrently or substantially concurrently. A first barrier wait instruction in each workitem, causes it to synchronize at synchronization point 501. Synchronizing at synchronization point 501 involves the workitems T1, T2, T3, and T4 waiting for the last workitem among them to arrive at 501, and then resuming execution concurrently or substantially concurrently.

At point 502, workitem T4 issues a barrier arrive instruction. The barrier arrive instruction notifies the next instance of the barrier to not wait on T4, and T4 proceeds without having to synchronize at the second instance of the barrier.

At synchronization point 503, workitems T1, T2 and T3 synchronize upon the second instance of the barrier, based upon a second barrier wait instruction in the instruction stream. When all workitems T1, T2 and T3 arrive at synchronization point 503, they resume execution concurrently or substantially concurrently.

At point 504, T1 issues a barrier skip instruction. The barrier skip instruction notifies any subsequent instances of barrier to not wait on T1, and T1 proceeds without having to synchronize at the subsequent instances of the barrier.

At synchronization point 505, workitems T2, T3 and T4 synchronize. Note, that although T4 had previously issued a barrier arrive instruction (at 502), this previous issuance only exempted T4 from the next occurring barrier (i.e., at synchronization point 503). After synchronization at synchronization point 505, T2, T3, and T4 proceed to synchronize again at synchronization point 506. When synchronized at synchronization point 506, T2 and T3 would have each encountered four instances of barrier wait instructions in their respective instruction streams. At this time, T4 would have only encountered three instances. The barriers at synchronization points 505 and 506 do not block for T1 because T1 issued barrier skip instruction at 504, preceding synchronization points 505 and 506.

At a point 507 in time, after the occurrence of 506, T1 issues a barrier reset instruction. This resets the barrier to its original configuration. The original barrier was configured to synchronize on all four workitems T1, T2, T3 and T4. The reset causes T1 to synchronize with T2, T3 and T4 at synchronization point 507. The synchronization at point 507 may achieved by implementing of the reset as a self-synchronizing instruction or by user-specified synchronization instructions associated with the reset.

Following the synchronization at point 507, T1-T4 proceed to synchronize at synchronization point 508 based upon a wait instruction in each workitem.

Figure 6:
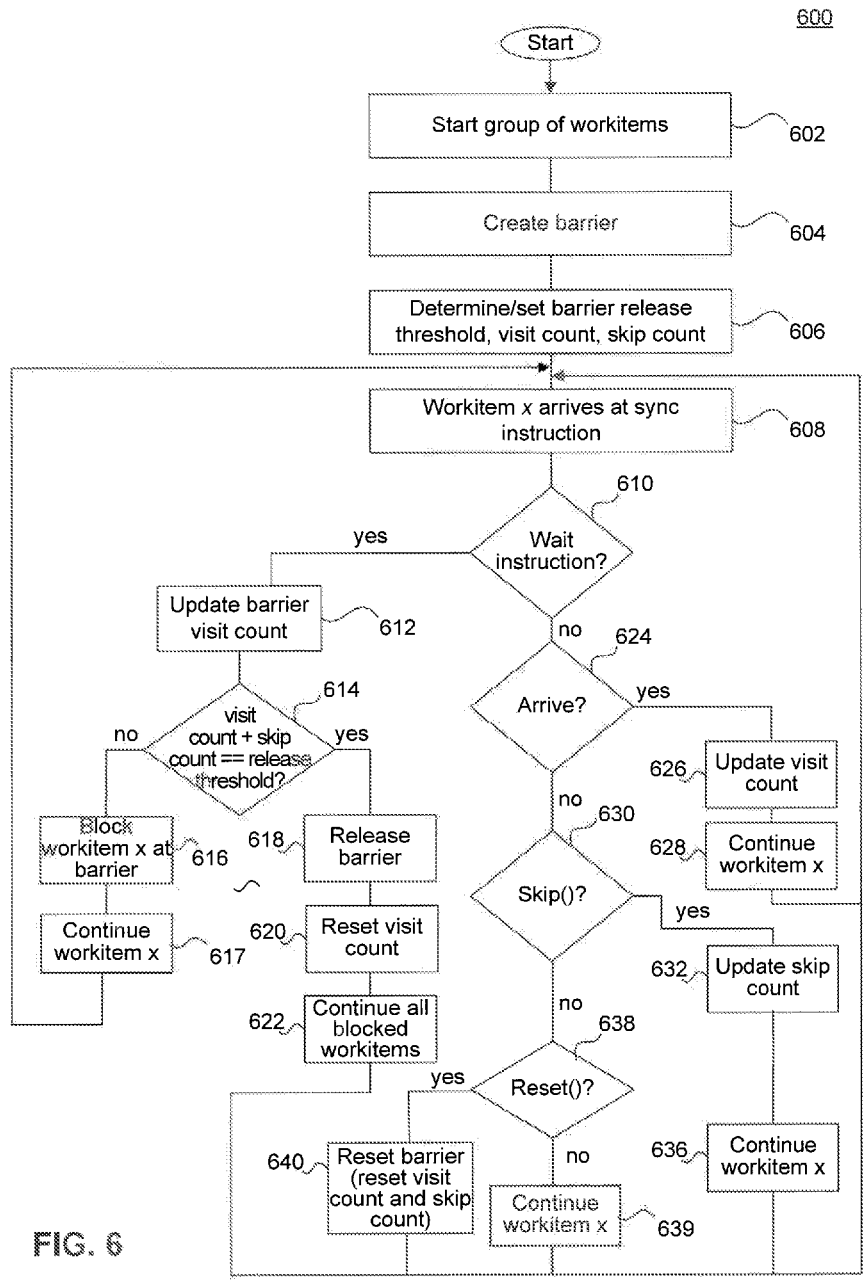
FIG. 6 illustrates a method for workitem synchronization, according to the embodiment.

FIG. 6 is an illustration of an exemplary method 600 for workitem synchronization in accordance with an embodiment.

At operation 602, a group of workitems is started. The workitems may be a plurality of workitems of identical code. The actual instruction sequence executed in respective workitems of identical code may be the same, or different, depending on conditional evaluations and the like. According to another embodiment, the workitems are not all identical code, and may comprise of any workitems that have share one or more synchronization points with each other.

The plurality of workitems may be started concurrently or non-concurrently. The workitems may be executed on a CPU, CPU, on two or more CPUs, on two or more cores of a CPU, or any combination of one or more CPU and one or more CPU cores. According to an embodiment, the plurality of workitems is a workgroup that executes on one processing element of a CPU.

At operation 604, a barrier b is created. Barrier b can be created, or instantiated, by executing an instruction on a workitem that declares barrier b. According to an embodiment, when the system encounters the first instance of a declaration of barrier b, an instance of the barrier is created in a memory. Workitems that subsequently declare barrier b receive a reference to the already created barrier b. The underlying implementation of barriers may be different in the respective frameworks and/or systems. A counting semaphore is an exemplary mechanism by which a barrier with the above semantics can be implemented.

Creation of the barrier b object in memory includes initializing one or more memory locations and/or registers in dynamic memory and/or hardware. For example, in relation to barrier b, several counts are required to be maintained as described below. The barrier object as well as all counts can be maintained in dynamic memory with the appropriate concurrency control mechanism in writing and reading to those memory locations. According to another embodiment, whereas an object corresponding to barrier b is instantiated in dynamic memory, the corresponding counts are maintained in specific hardware registers.

At operation 606, various counts required to initialize barrier b are determined and their initial values are set. The number of visiting workitems ("visit count") defines the number of workitems that have reached barrier b. A workitem has "reached" a barrier, when it issues a barrier wait instruction or equivalent. The visit count may be initialized to 0. The number of workitems that have executed a barrier skip instruction on barrier b may be tracked in a skipped count ("skip count"). A barrier release threshold ("release threshold") is the number of workitems the barrier is waiting on. According to an embodiment, barrier b is initialized with a release threshold that is equal to the number of workitems in the group that was started at operation 602. According to another embodiment, the barrier b is created (at operation 604) with a defined size regardless of the size of the group started at operation 602. Therefore, the release threshold is initialized to the defined size.

At operation 608, after executing any number of other instructions from an instructions flow, workitem x arrives at a synchronization instruction. A synchronization instruction may be one of, but is not limited to, a barrier wait, a barrier arrive, a barrier skip, and a barrier reset.

At operation 610, a decision is made whether the synchronization instruction is a barrier wait instruction, and if so, method 600 proceeds to operation 612.

At operation 612, the visit count is updated. According to an embodiment, the visit count is incremented by one to indicate that workitem x reached the barrier.

At operation 614, the sum of the updated visit count and the skip count is compared to the release threshold. If the sum is equal to or greater than the release threshold, then workitem x is the last workitem to arrive at the barrier, and the barrier is released at operation 618. Releasing the barrier, according to an embodiment, causes one or more count values to be reset and the blocked workitems to resume execution.

The release of the barrier causes the resetting of the visit count at operation 620 and resuming of all workitems blocked on barrier at operation 622. At operation 620, according to an embodiment, the visit count is reset to 0. Note that resetting the visit count erases any effects of barrier arrive instructions that occurred earlier. However, resetting the visit count does not erase the effects of any barrier skip instructions that occurred earlier. The resetting of only the visit count, as done in the event of a barrier release from a block, can be considered as a "part-reset" operation on the barrier. The term "part-reset", as used herein, conveys that the portion of the barrier that applies to workitems that have not issued a skip instruction is reset.

At operation 622, all blocked workitems resume execution. According to an embodiment, blocked workitems may be waiting on a semaphore, and the semaphore is reset so that the blocked workitems can resume execution. For example, a counting semaphore, implemented in hardware or software, can be used to block workitems. After completing operation 622, method 600 proceeds to operation 608.

If, at operation 614, it is determined that the sum of the visit count and skip count is not equal to the release threshold, then at operation 616, workitem x is blocked. The blocking of workitem x may, according to an embodiment, be performed by causing the workitem to wait on a semaphore. Workitem x will subsequently be released when operations 618-622 occurs for the barrier. Operation 619 represents the continuation of execution of workitem x upon release of the barrier, for example, by operations 618-622.

If, at operation 610, it is decided that the instruction is not a barrier wait instruction, then at operation 624, it is decided whether the instruction is a barrier arrive. If yes, then at operation 626 the visit count is updated. According to an embodiment, the visit count is incremented by one to indicate that workitem x has reached the barrier. After updating the visit count, at operation 628, workitem x continues its execution of the instruction stream. Subsequently, processing proceeds to operation 608 when the next synchronization instruction is encountered.

If, at operation 624, it is decided that the instruction is not a barrier arrive instruction, then at operation 630, it is decided whether the instruction is a barrier skip. If yes, then at operation 632, the skip count is updated. According to an embodiment, the skip count is incremented by 1. Then at operation 636, workitem x continues to execute and proceeds to operation 608 when the next synchronization instruction is encountered.

If, at operation 630, it is decided that the instruction is not a barrier skip instruction, then at operation 638, it is determined whether the instruction is a barrier reset. If yes, then at operation 640, the barrier b is reset. According to an embodiment, resetting the barrier in response to a barrier reset instruction includes setting the visit count and skip count to 0. Thus, after a barrier reset is executed on barrier b, barrier b is reset to its original state. In some situations, race conditions may occur if all workitems in the group are not synchronized at the barrier. Therefore, in some embodiments, a barrier reset instruction may be implemented as a self-synchronizing instruction and may cause a synchronization point across all workitems. In other embodiments, a user may include one or more synchronization points to ensure synchronization at the reset instruction. Following operation 640, processing may continue to operation 608, when the next synchronization instruction is encountered in the instruction stream.

If it is determined at step 638, that the instruction is not a barrier reset instruction then, at operation 639, workitem x may continue execution. Following operation 639, processing may continue to operation 608, when the next synchronization instruction is encountered in the instruction stream.

According to another embodiment, instead of maintaining a separate skip count and release threshold for a barrier, only the release threshold may be maintained. For example, the release threshold may be decremented to reflect that a workitem has executed a barrier skip instruction. Then, when a barrier reset instruction is issued, the resetting of counts would include resetting the release threshold to its original dimension. In effect, according to this approach, the number of workitems that execute a barrier skip may be considered as leaving the synchronization group.

Figure 7:
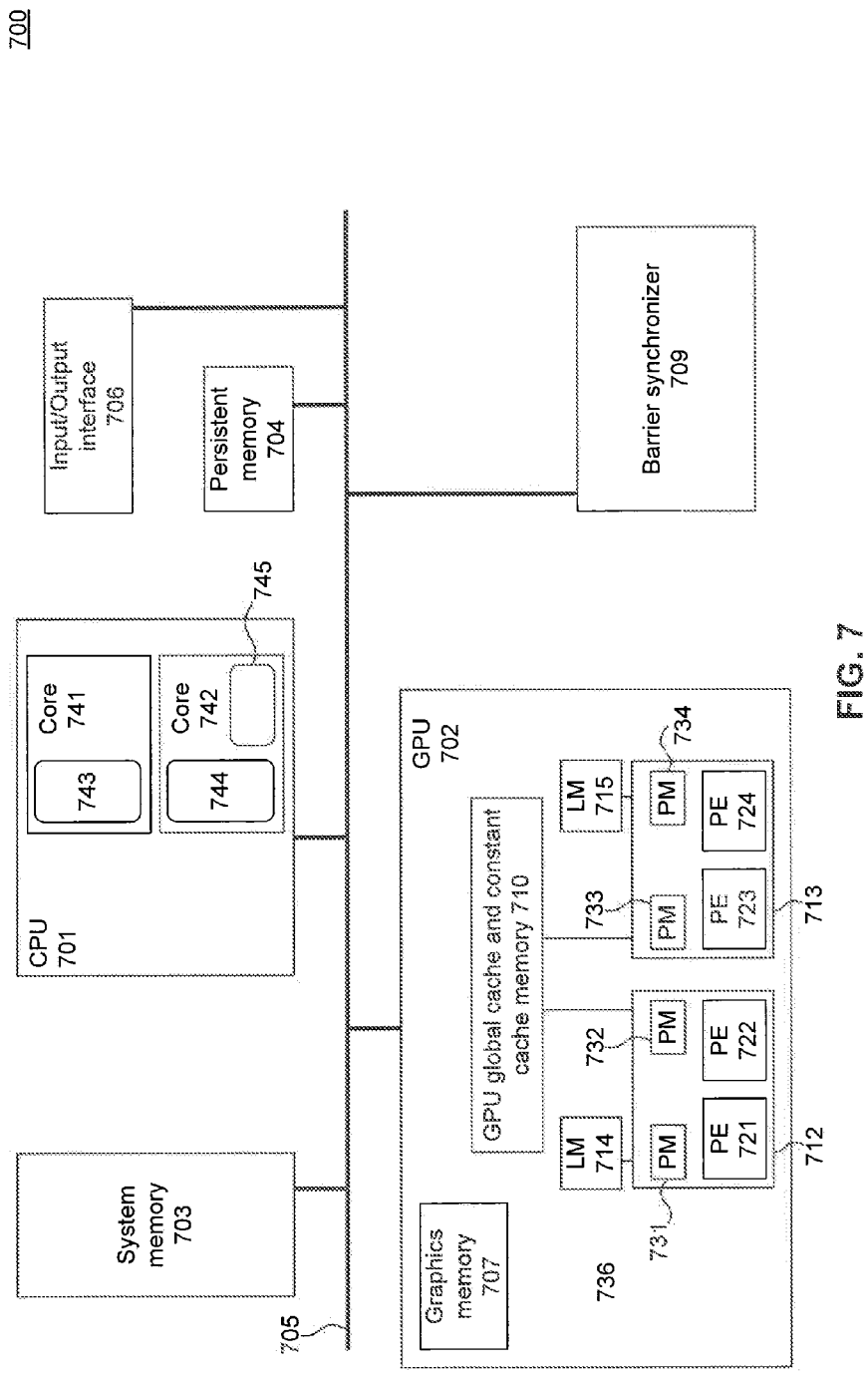
FIG. 7 illustrates a block diagram of a system for workitem synchronization, according to an embodiment.

FIG. 7 is a block diagram illustration of a system for workitem synchronization in accordance with an embodiment. In FIG. 7, an example heterogeneous computing system 700 can include one or more CPUs, such as CPU 701, and one or more GPUs, such as GPU 702. Heterogeneous computing system 700 can also include system memory 703, persistent storage device 704, system bus 705, an input/output device 706, and a barrier synchronizer 709.

CPU 701 can include a commercially available control processor or a custom control processor. CPU 701, for example, executes the control logic that controls the operation of heterogeneous computing system 700. CPU 701 can be a multi-core CPU, such as a multi-core CPU with two CPU cores 741 and 742. CPU 701, in addition to any control circuitry, includes CPU cache memories 743 and 744 of CPU cores 741 and 742, respectively. CPU cache memories 743 and 744 can be used to temporarily store instructions and/or parameter values during the execution of an application on CPU cores 741 and 742, respectively.

For example, CPU cache memory 743 can be used to temporarily store one or more control logic instructions, values of variables, or values of constant parameters, from the system memory 703 during the execution of control logic instructions on CPU core 741. CPU 701 can also include specialized vector instruction processing units. For example, CPU core 742 can include a Streaming SIMD Extensions (SSE) unit that can efficiently process vectored instructions. A person skilled in the art will understand that CPU 701 can include more or less than the CPU cores in the example chosen, and can also have either no cache memories, or more complex cache memory hierarchies.

GPU 702 can include a commercially available graphics processor or custom designed graphics processor. GPU 702, for example, can execute specialized code for selected functions. In general, GPU 702 can be used to execute graphics functions such as graphics pipeline computations and rendering of image on a display.

GPU 702 includes a GPU global cache memory 710 and one or more compute units 712 and 713. A graphics memory 707 can be included in, or coupled to, GPU 702. Each compute unit 712 and 713 are associated with a GPU local memory 714 and 715, respectively. Each compute unit includes one or more GPU processing elements (PE). For example, compute unit 712 includes GPU processing elements 721 and 722, and compute unit 713 includes GPU PEs 723 and 724.

Each GPU processing element 721, 722, 723, and 724, is associated with at least one private memory (PM) 731, 732, 733, and 734, respectively. Each GPU PE can include one or more of a scalar and vector floating-point units. The GPU PEs can also include special purpose units such as inverse-square root units and sine/cosine units. GPU global cache memory 710 can be coupled to a system memory such as system memory 703, and/or graphics memory such as graphics memory 707.

System memory 703 can include at least one non-persistent memory such as dynamic random access memory (DRAM). System memory 703 can store processing logic instructions, constant values and variable values during execution of portions of applications or other processing logic. For example, the control logic and/or other processing logic of barrier synchronizer 709 can reside within system memory 703 during execution of barrier synchronizer 709 by CPU 701. The term "processing logic," as used herein, refers to control flow instructions, instructions for performing computations, and instructions for associated access to resources.

Persistent memory 704 includes one or more storage devices capable of storing digital data such as magnetic disk, optical disk, or flash memory. Persistent memory 704 can, for example, store at least parts of instruction logic of barrier synchronizer 709. At the startup of heterogeneous computing system 700, the operating system and other application software can be loaded in to system memory 703 from persistent storage 704.

System bus 705 can include a Peripheral Component Interconnect (PCI) bus, Industry Standard Architecture (ISA) bus, or such a device. System bus 705 can also include a network such as a local area network (LAN), along with the functionality to couple components, including components of heterogeneous computing system 700.

Input/output interface 706 includes one or more interfaces connecting user input/output devices such as keyboard, mouse, display and/or touch screen. For example, user input can be provided through a keyboard and mouse connected user interface 706 to heterogeneous computing system 700. The output of heterogeneous computing system 700, can be output to a display through user interface 706.

Graphics memory 707 is coupled to system bus 705 and to GPU 702. Graphics memory 707 is, in general, used to store data transferred from system memory 703 for fast access by the GPU. For example, the interface between GPU 702 and graphics memory 707 can be several times faster than the system bus interface 705.

Barrier synchronizer 709 includes logic to synchronize functions and processing logic on either or both GPU 702 and CPU 701. Barrier synchronizer 709 may be configured to synchronize workitems globally across groups of processors in a computer, in each individual processor, and/or within each processing element of a processor. Barrier synchronizer 709 is further described in relation to FIG. 8 below. A person of skill in the art will understand that barrier synchronizer can be implemented using software, firmware, hardware, or any combination thereof. When implemented in software, for example, barrier synchronizer 709 can be a computer program written in C or OpenCL, that when compiled and executing resides in system memory 703. In source code form and/or compiled executable form, barrier synchronizer 709 can be stored in persistent memory 704. In one embodiment, some or all of the functionality of barrier synchronizer 709 is specified in a hardware description language such as Verilog, RTL, netlists, to enable ultimately configuring a manufacturing process through the generation of maskworks/photomasks to generate a hardware device embodying aspects of the invention described herein.

A person of skill in the art will understand that heterogeneous computing system 700 can include more or less components that shown in FIG. 7. For example, heterogeneous computing system 700 can include one or more network interfaces, and or software applications such as the OpenCL framework.

Figure 8:
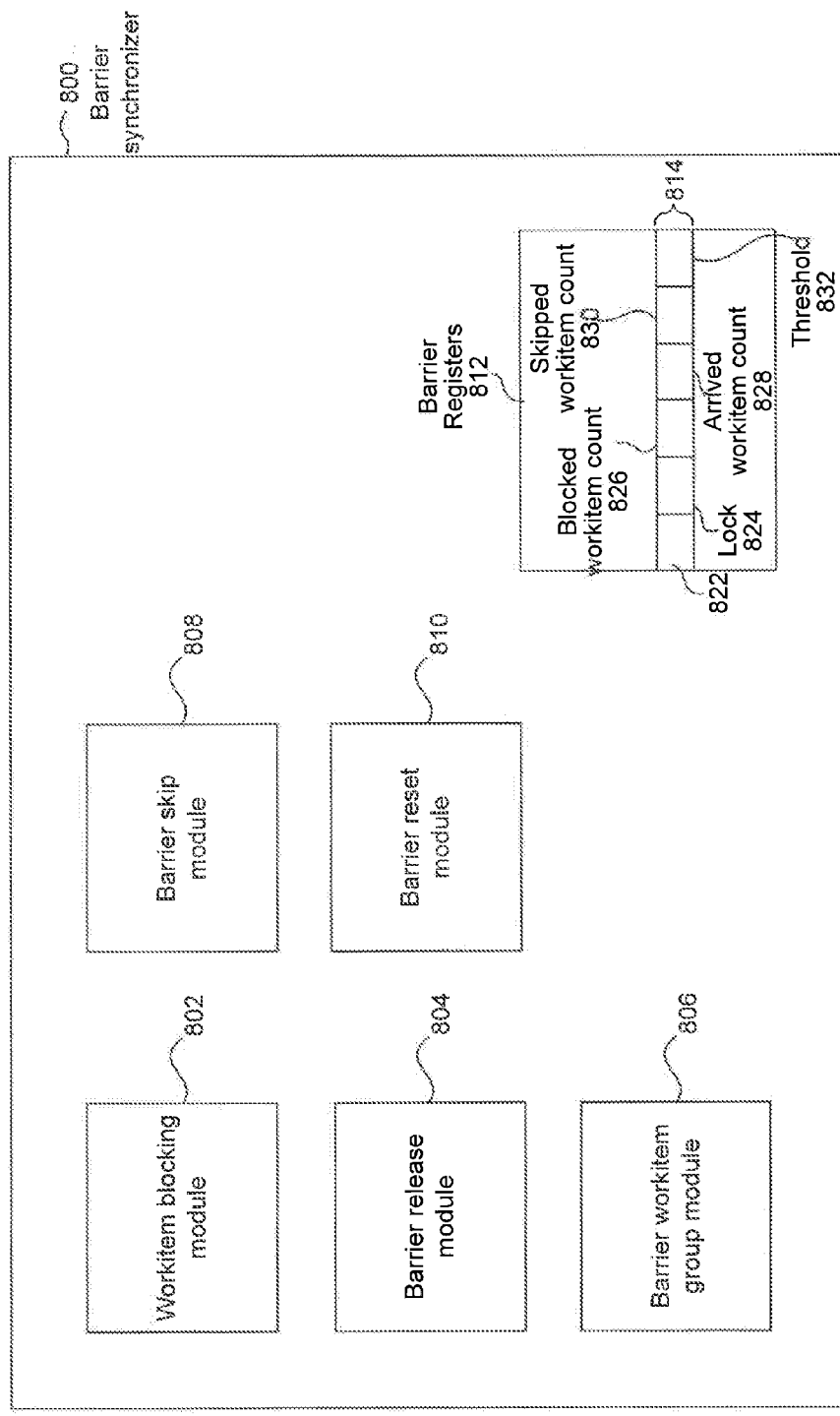
FIG. 8 illustrates a block diagram of a workitem synchronization module, according to an embodiment.

FIG. 8 is an illustration of barrier synchronizer 800, according to an embodiment. Barrier synchronizer 800 includes a workitem blocking module 802, a barrier release module 804, a barrier workitem group module 806, a barrier skip module 808, and a barrier reset module 810. Moreover, barrier synchronizer 800 can include barrier registers 812. According to an embodiment, barrier synchronizer 800 is included in barrier synchronizer 709.

Workitem blocking module 802 operates to block one or more workitems on a barrier. A barrier can be implemented using a semaphore (e.g., counting semaphore) and registers. Workitem blocking may be implemented by causing blocked workitems to wait upon the semaphore. The semaphore may be implemented in hardware or software. Workitems may be blocked when a barrier wait instruction is encountered. Workitem blocking module can, for example, include processing logic to implement operations, including operation 616 of method 600.

Barrier release module 804 operates to release a barrier when a sufficient number of workitems have reached it. As described above, a barrier can be implemented using a semaphore, and releasing the barrier may include releasing the semaphore. Workitems can be released when a barrier wait instruction is encountered and it turns out to be the last workitem to complete the requirements for number of workitems to reach the barrier. Barrier release module can, for example, include processing logic to implement operations, including operations 618-622 of method 600.

Barrier workitem group module 806 operates to keep track of the synchronization groups among the various executing workitems. Barrier workitem group module 806 may also operate to create and initialize the barriers according to group makeup. According to an embodiment, Barrier release module 806 can, for example, include processing logic to implement operations, including operations 602-606 of method 600.

Barrier skip module 808 operates to implement the barrier skip instructions. For example, barrier skip instruction would cause the skip count for the corresponding barrier to be updated. According to an embodiment, barrier skip module 808 can include processing logic to implement operations, including operations 630-636 of method 600.

Barrier reset module 810 operates to implement the barrier reset instructions. For example, barrier reset instruction would cause the visit count and skip counts related to the barrier to be reset, and/or the release threshold adjusted. Barrier reset module 810 can, for example, include processing logic to implement operations, including operations 638-640 of method 600.

Barrier registers 812, includes hardware and/or software registers that relate to the barriers. Barrier registers 812 can include barrier records 814 comprising a plurality of registers and/or memory locations. An exemplary barrier record 814 includes a barrier identifier 822, a lock 824, a blocked workitem count 826, an arrived workitem count 828, a skipped workitem count 830, and threshold 832. Barrier identifier 822 can be a pointer, index, or other identifier to uniquely identify the memory location or register of the barrier.

Lock 824 may be a pointer or reference to a semaphore or other entity upon which the processes are blocked. Blocked workitem count 826 is the number of workitems that are blocked upon the barrier. Arrived workitem count 828 is the number of workitems that have issued a barrier arrive instruction. Skipped workitem count 830 is the number of workitems that have issued a barrier skip instruction. Threshold 832 is the release threshold, or group size of the synchronization group.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of synchronizing a group of workitems on one or more processors, comprising:
   executing a barrier skip instruction by a first workitem from the group; and
   responsive to the executed barrier skip instruction, reconfiguring a barrier to synchronize other workitems from the group in a plurality of points in a sequence without requiring the first workitem to reach the barrier in any of the plurality of points and while allowing the first workitem to proceed without having to synchronize at the barrier in any of the plurality of points.

2. The method of claim 1, further comprising:
   configuring the barrier to synchronize the group at a sequence of synchronization points, wherein the sequence includes the plurality of points.

3. The method of claim 1, wherein reconfiguring the barrier to synchronize other workitems includes:
   incrementing a skip count associated with the barrier, wherein the skip count is used in determining whether all workitems from the group have reached the barrier.

4. The method of claim 1, further comprising:
   synchronizing the other workitems at first and second points of the plurality of points, wherein the first workitem did not reach the barrier at the first and second points.

5. The method of claim 4, wherein synchronizing the other workitems comprises:
   for each of the other workitems that reach the barrier, determining if it is a last one of the other workitems; and
   when the last of the other workitems reaches the barrier, unblock all the other workitems to resume processing.

6. The method of claim 5, wherein the determining if it is the last one of the other workitems comprises:
   comparing a sum of a skip count and a visit count to a release threshold, wherein the skip count is incremented when the skip instruction is executed, wherein the visit count is incremented when a workitem reaches the barrier, and wherein the release threshold corresponds to a number of workitems in the group.

7. The method of claim 4, wherein synchronizing the other workitems comprises:
   synchronizing the other workitems at the first point;
   part-resetting the barrier to synchronize only the other workitems; and
   synchronizing the other workitems at the second point following the part-resetting of the barrier to synchronize only the other workitems.

8. The method of claim 7, wherein part-resetting the barrier to synchronize only the other workitems comprises:
   setting a visit count associated with the barrier to an initial value indicating no workitems have reached the barrier, wherein the visit count represents a number of workitems that reach the barrier; and
   persisting a value of a skip count, wherein the skip count is incremented when a workitem issues a barrier skip instruction.

9. The method of claim 1, further comprising:
   executing a barrier reset instruction by any workitem from the group; and
   responsive to the barrier reset instruction, further reconfiguring the barrier to require all workitems from the group to reach the barrier in order to synchronize the group.

10. The method of claim 9, wherein further reconfiguring the barrier to require all workitems comprises:
    setting a visit count associated with the barrier to an initial value indicating no workitems have reached the barrier; and
    setting a skip count associated with the barrier to an initial value indicating no workitems have issued a barrier skip instruction associated with the barrier.

11. The method of claim 1, wherein the group of workitems is a workgroup, and wherein the workgroup is executing in a processing element of a graphics processing unit.

12. The method of claim 1, wherein the group includes workitems from two or more workgroups of a wavefront executing in a graphics processing unit.

13. The method of claim 1, wherein the group includes workitems executing on a CPU.

14. The method of claim 1, wherein configuring the barrier to synchronize the group at a sequence of synchronization points is performed in response to an instruction included in a library function.

15. A system, comprising:
    one or more processors;
    a group of workitems executing on the one or more processors; and
    a barrier synchronization module is configured to, when executed by the one or more processors, cause the one or more processors to:
       execute a barrier skip instruction by a first workitem from the group; and
       responsive to the executed barrier skip instruction, reconfigure a barrier to synchronize other workitems from the group in a plurality of points in a sequence without requiring the first workitem to reach the barrier in any of the plurality of points and while allowing the first workitem to proceed without having to synchronize at the barrier in any of the plurality of points.

16. The system of claim 15, wherein the barrier synchronization module is further configured to, when executed by the one or more processors, cause the one or more processors to:
    configure a barrier to synchronize the group at a sequence of synchronization points, wherein the sequence includes the plurality of points.

17. The system of claim 15, wherein the one or more processors are part of a heterogeneous computing system.

18. The system of claim 15, wherein the barrier synchronization module is further configured to, when executed by the one or more processors, cause the one or more processors to:
    execute a barrier reset instruction by any workitem from the group; and
    responsive to the barrier reset instruction, further reconfigure the barrier to require all workitems from the group to reach the barrier in order to synchronize the group.

19. A non-transitory computer readable medium storing commands, wherein the commands, if executed, cause a method comprising:
    executing a barrier skip instruction by a first workitem from the group; and
    responsive to the executed barrier skip instruction, reconfiguring a barrier to synchronize other workitems from the group in a plurality of points in a sequence without requiring the first workitem to reach the barrier in any of the plurality of points and while allowing the first workitem to proceed without having to synchronize at the barrier in any of the plurality of points.

20. A non-transitory computer readable medium of claim 19, wherein the commands, if executed, cause a method further comprising:

configuring a barrier to synchronize the group at a sequence of synchronization points, wherein the sequence includes the plurality of points.

* * * * *